Oct. 7, 1930.　　　　G. A. SMITH　　　　1,777,384
BEAN SNIPPER
Filed June 24, 1929
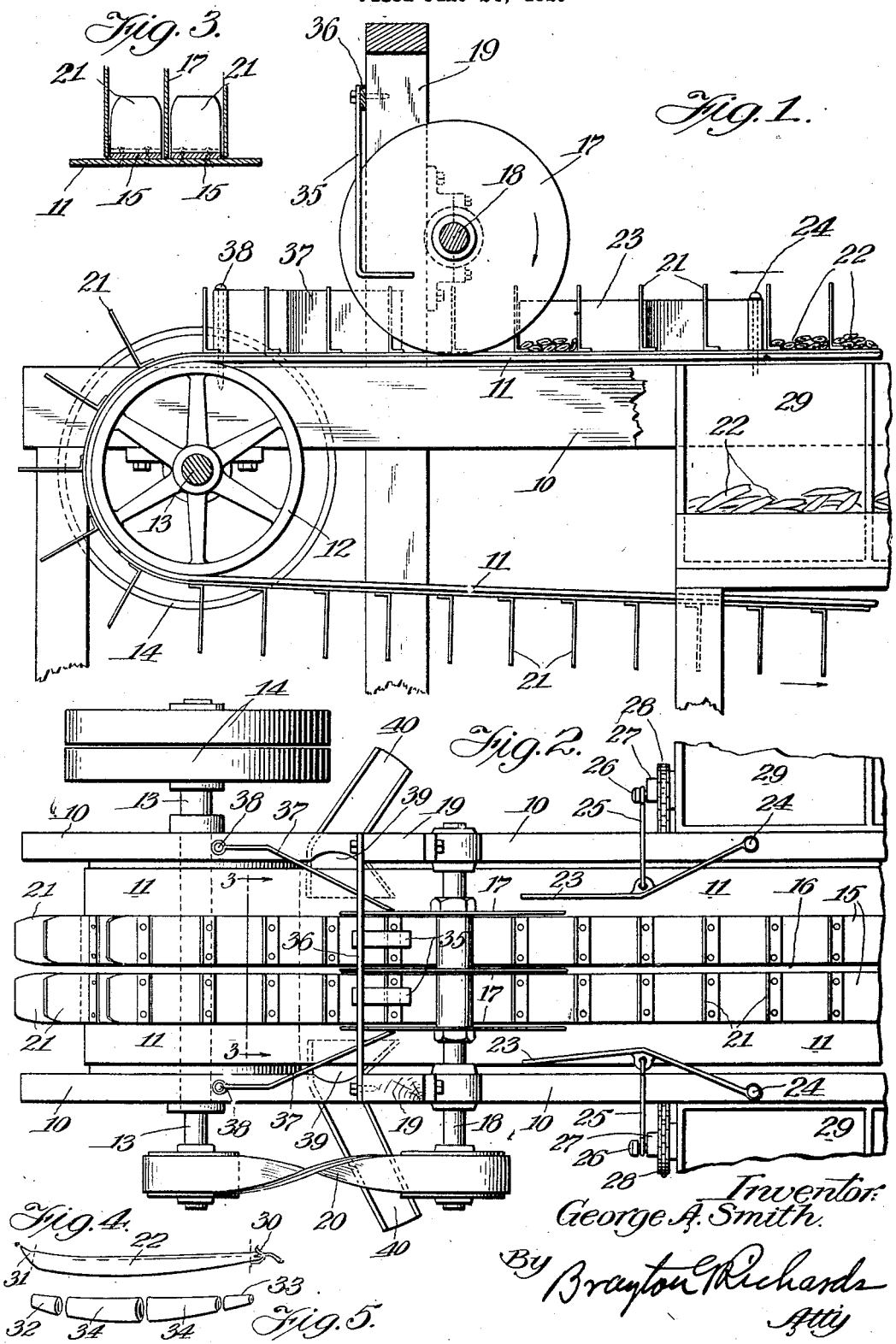
Inventor:
George A. Smith.
By Brayton Richards
Atty Patented Oct. 7, 1930

1,777,384

UNITED STATES PATENT OFFICE

GEORGE A. SMITH, OF STAYTON, OREGON

BEAN SNIPPER

Application filed June 24, 1929. Serial No. 373,084.

The invention relates to improvements in bean snippers and has for its object the provision of an improved construction of this character adapted and arranged to snip or cut beans for canning purposes.

Another object of the invention is to provide a machine of this character adapted and arranged to snip or cut the beans and at the same time separate the more or less imperfect cuts or snips from the perfect ones.

Other objects will appear hereinafter.

The invention consists in the combinations and arrangements of parts hereinafter described and claimed.

The invention will be best understood by reference to the accompanying drawing forming a part of the specification, and in which:

Fig. 1 is a partial longitudinal vertical section of the machine embodying the invention.

Fig. 2 is a top plan view corresponding with Figure 1,

Fig. 3 is a partial section taken substantially on line 3—3 of Figure 2,

Fig. 4 is a view of the bean before being treated by the machine and

Fig. 5 is a view of a bean after it has been snipped by the machine but before separation of the parts thereof.

The preferred form of construction, as illustrated in the drawing, comprises a suitable frame 10 having a traveling conveyor mounted to travel longitudinally thereon. This conveyor comprises a main broad conveyor belt 11 adapted and arranged to travel over suitable pulleys 12 at the ends of the frame 10. One of the pulleys 12 is carried by a main driving shaft 13, operable by a tight and a loose pulley 14, as will be readily understood, a belt, not shown, being used to drive said shaft.

Superposed upon the main belt 11 are two supplemental belts 15 arranged closely adjacent to each other so as to provide a narrow slot 16 between them. Rotating circular cutting knives 17 are mounted on a shaft 18 arranged as shown upon standards 19, provided in the frame of the machine. The shaft 18 is driven, as shown, by means of a crossed belt 20. The knives 17 are arranged, as shown, to co-operate with the slot 16 between the superposed belts 15 and also with the outer edges of said superposed belts so as to sever cleanly the beans resting on the belts 15.

A plurality of upstanding conveyor plates 21 are secured, as shown, to the superposed belts 15 and are adapted and arranged to receive the beans 22 between them forming pocket-like spaces for the reception of said beans.

Associated with the conveyor are two simultaneously swinging alternately operating jogger blades 23, pivoted at 24 on the side rails of the frame 10 and connected by links 25 to pins 26 on the ends of counter shafts 27 and driven by suitable sprockets 28, and whereby said jogger blades 23 will be reciprocated with each other to position the ends of the beans 22 uniformly between the blades 21 and on the superposed belts 15. Suitable bins 29 are provided on opposite sides of the conveyor for containing the beans 22 to be snipped or cut.

In use, the beans are removed by hand from the bins 29 and have the ends 30 and 31 snipped therefrom by hand, the bodies of the beans being placed between the blades 21 on the superposed belts 15, said blades causing said bean bodies to be carried into cutting relationship with the knives 17. As the bean bodies thus proceed on the conveyor, they come into cooperative relationship with the jogger blades 23, which serve to position said bean bodies uniformly between said blades. Then the bean bodies are subjected to the action of the knives 17, which sever the same, as indicated in Figure 5 into the two end pieces 32 and 33 and the body portions 34, the knives 17 performing the three cuts indicated.

Arranged between the knives 17 are two stripper blades 35 in L form and suspended on the cross bar 36 on the standards 19. By this arrangement the severed bean sections lying between the knives 17 will be prevented from rising upwardly and forwardly with said knives as they rotate and will be stripped or discharged from said knives back upon said conveyor if they do so.

Co-operating with the knives 17 and the conveyor belt 11 are two laterally inclined deflectors or separating blades 37 secured at 38 to the side rails of the frame of the machine. These deflector blades extend from positions closely adjacent the outer sides of the outermost knives 17 and extend outwardly and forwardly over the surface of the outer portions of the belt 11, as shown, and serve to deflect the severed outer end portions 32 and 33 of the bean bodies outwardly to be discharged over the outer edges of the belt 11. To facilitate such discharge, openings 39 are provided at these points for the free passage of the bean ends and suitable chutes 40 are arranged below to receive and ultimately discharge the severed ends 32 and 33. The main body portions 34 of the beans continue on between the blades 21 to the end of the conveyor and are there discharged into a suitable receptacle, or on to a suitable conveyor as desired. It will thus be seen that the severed ends 32 and 33 of the bean bodies will be automatically separated from the body portion 34 of said bean bodies. The severed ends 32 and 33 are more or less imperfect or irregular in size and are therefore not as desirable for canning purposes as the main body portions 34. The machine therefore serves the function of separating the desirable from the undesirable portions of the beans being snipped or cut thereby.

By means of the arrangement disclosed, beans or similar articles may be rapidly and efficiently cut and suitably separated for facilitating canning operations and the like.

While I have illustrated and described the preferred form of construction for carrying the invention into effect, this is capable of variation and modification without departing from the spirit of the invention. I therefore do not wish to be limited to the precise details disclosed but would desire to avail myself of the various variations and modifications as so fall within the scope of the appended claims.

Having thus fully described my invention, what I claim as new and desire to secure by Letters Patent is:

1. A machine of the class described comprising a conveyor in the form of an endless belt traveling substantially horizontally; a plurality of rotating circular knives arranged over said belt and co-operating therewith; a pair of reciprocating joggers on opposite sides of said conveyor adapted to engage and position the ends of articles thereon; and inclined deflectors co-operating with said knives and belt to deflect and discharge the ends of objects cut by said knives.

2. A machine of the class described comprising a conveyor in the form of an endless belt traveling substantially horizontally; two or more belts superposed upon said conveyor belt with a narrow slot between them; a plurality of rotating circular knives arranged above said conveyor to operate between and against the edges of said superposed belts; simultaneously swinging alternately operating joggers on opposite sides of said conveyor adapted and arranged to engage and position the ends of the articles on said conveyor; upstanding conveyor plates on said superposed belts; and inclined deflectors co-operating with said knives and said conveyor to deflect and discharge the ends of objects severed by said knives.

In witness whereof, I have hereunto set my hand this 8th day of March, 1929.

GEORGE A. SMITH.